(12) United States Patent
Ha et al.

(10) Patent No.: US 8,314,182 B2
(45) Date of Patent: Nov. 20, 2012

(54) RESIN COMPOSITION HAVING GOOD SCRATCH RESISTANCE

(75) Inventors: Doo Han Ha, Yeosu-si (KR); Bong Jae Jeong, Yeosu-si (KR)

(73) Assignee: Cheil Industries Inc., Gumi-si (KR)

(*) Notice: Subject to any disclaimer, the term of this patent is extended or adjusted under 35 U.S.C. 154(b) by 582 days.

(21) Appl. No.: 12/253,463

(22) Filed: Oct. 17, 2008

(65) Prior Publication Data

US 2009/0043047 A1 Feb. 12, 2009

Related U.S. Application Data

(63) Continuation-in-part of application No. PCT/KR2007/002187, filed on May 3, 2007.

(30) Foreign Application Priority Data

May 4, 2006 (KR) .................. 10-2006-0040708

(51) Int. Cl.
- C08F 279/02 (2006.01)
- C08L 33/08 (2006.01)
- C08L 33/12 (2006.01)
- C08L 33/10 (2006.01)
- C08L 51/04 (2006.01)

(52) U.S. Cl. ............... 525/80; 525/83; 525/84

(58) Field of Classification Search ............ 525/80, 525/83, 84

See application file for complete search history.

(56) References Cited

U.S. PATENT DOCUMENTS

| | | | |
|---|---|---|---|
| 4,173,596 A * | 11/1979 | De Witt ......... | 428/402 |
| 4,443,585 A | 4/1984 | Goldman | |
| 4,801,646 A | 1/1989 | Henton | |
| 4,908,414 A | 3/1990 | Bronstert et al. | |
| 5,204,406 A | 4/1993 | Fujii et al. | |
| 5,242,982 A | 9/1993 | Oshima et al. | |
| 5,382,625 A * | 1/1995 | Lindner et al. ......... | 525/81 |
| 5,969,042 A | 10/1999 | Tiefensee et al. | |
| 6,531,185 B1 | 3/2003 | Drujon et al. | |
| 6,777,492 B1 | 8/2004 | Nakai et al. | |
| 6,811,859 B2 * | 11/2004 | Bonnet et al. ......... | 428/216 |
| 2001/0034415 A1 * | 10/2001 | Queisser et al. ........ | 525/212 |
| 2003/0109638 A1 * | 6/2003 | Briggs et al. ........... | 525/192 |
| 2006/0147714 A1 | 7/2006 | Schultes et al. | |
| 2007/0167573 A1 | 7/2007 | Stork et al. | |
| 2009/0043047 A1 | 2/2009 | Ha et al. | |

FOREIGN PATENT DOCUMENTS

| | | |
|---|---|---|
| CN | 1247201 A | 3/2000 |
| DE | 19527579 A1 | 1/1997 |
| DE | 19961894 A1 | 6/2001 |
| DE | 10260065 A1 | 7/2004 |
| EP | 0985692 A2 | 3/2000 |
| EP | 2027207 A1 | 2/2009 |
| JP | 61-195148 A | 8/1986 |
| KR | 10-2004-0049066 A | 6/2004 |
| WO | 2005/059029 A1 | 6/2005 |
| WO | 2007129835 A1 | 11/2007 |
| WO | 2008082173 A1 | 7/2008 |

OTHER PUBLICATIONS

Lindner et al., CAPLUS AN 1982:69993 (May 1984).*
Ootani et al., CAPLUS AN 1995:703347 (Apr. 1995).*
Anonymous, STN File Registry, registry No. 9010-94-0, Nov. 1984.*
International Preliminary Report on Patentability in counterpart International Application No. PCT/KR2007/002187, issued on Nov. 4, 2008.
European Office Action in counterpart European Application No. EP07746342.0/2109, dated Jun. 18, 2009.
European Office Action in counterpart European Application No. EP07746342.0/2109, dated Feb. 24, 2010.
International Search Report in counterpart International Application No. PCT/KR2007/002187, mailed on Aug. 8, 2007.
Taiwanese Office Action in counterpart Taiwanese Application No. 096115835 mailed Jul. 28, 2011, pp. 1-4.
English translation of Taiwanese Office Action in counterpart Taiwanese Application No. 096115835 mailed Jul. 28, 2011, pp. 1-5.
International Search Report in commonly owned International Application No. PCT/KR2007/006925, mailed on Mar. 26, 2008, pp. 1-2.
Landier, C. et al., Synthesis of Core/Shell Latexes in a Continuous Stirred Tank Reactor, Industrial & Engineering Chemistry Research, Feb. 2004, vol. 43, No. 3, pp. 700-707, ISSN 0888-5885.
European Search Report in commonly owned European Application No. 07746342, dated Apr. 16, 2009, pp. 1-2.
Office Action in commonly owned U.S. Appl. No. 12/476,396 dated May 2, 2011, pp. 1-15.

* cited by examiner

*Primary Examiner* — Jeffrey Mullis
(74) *Attorney, Agent, or Firm* — Summa, Additon & Ashe, P.A.

(57) ABSTRACT

A resin composition having good scratch resistance includes about 5 to about 50 parts by weight of core-shell graft resin (A) and about 95 to about 50 parts by weight of resin (B) which includes about 40 to about 100% by weight of (meth) acrylic acid alkyl ester. The outer shell of the core-shell graft resin (A) comprises (meth)acrylic acid alkyl ester.

13 Claims, No Drawings

RESIN COMPOSITION HAVING GOOD SCRATCH RESISTANCE

CROSS-REFERENCE TO RELATED APPLICATIONS

This non-provisional application is a continuation-in-part application of PCT Application No. PCT/KR2007/002187, filed May 3, 2007, pending, which designates the U.S., and which is hereby incorporated by reference in its entirety, and claims claims priority therefrom under 35 USC Section 120. This application also claims priority under 35 USC Section 119 from Korean Patent Application No. 10-2006-0040708, filed May 4, 2006, which is also hereby incorporated by reference in its entirety.

FIELD OF THE INVENTION

The present invention relates to a scratch resistant resin composition.

BACKGROUND OF THE INVENTION

Acrylonitrile-butadiene-styrene graft copolymer resin (hereinafter, ABS resin) generally has good impact resistance, processability, mechanical strength, heat distortion temperature and gloss. Therefore, the resin has been widely used in the manufacture of electric or electronic goods, office automation (OA) instruments, and the like. However, ABS resins used in the manufacture of electronic product housings for LCDs, PDP TVs, audio equipment, and the like, tend to show scratches as a result of injection molding or during normal usage. Further, it can be difficult to impart a desired color to the ABS resin, which can decrease its commercial value.

To avoid this problem, the surface of the molded ABS resin article can be coated with urethane or UV or scratch-resistant acryl. However, these coating methods require post-processing treatment. This can complicate the manufacturing process and result in a high defect rate, which in turn can decrease productivity. Further, these coating methods can give rise to a problem of environmental contamination. Therefore there remains a need for a scratch resistant resin having improved gloss and impact resistance and which can be readily processed using injection molding processes.

Scratch resistant resins should have colorability and high gloss, because molded articles produced using such resins, unlike conventional ABS resin, typically are not coated with a urethane coating. Conventional ABS resin does not have sufficient scratch resistance even when it is coated with urethane.

Acryl resin, PMMA resin, and the like are examples of scratch resistant materials which do not require a urethane coating and which have good colorability and gloss. However, PMMA resin has poor impact resistance and insufficient moldability, which can make injection molding difficult. Therefore, this material is generally molded as an extrusion sheet and the extruded sheet is attached to a molded article. However, this method can be expensive and have a high defect rate due to post-processing steps.

Besides PMMA resin, methyl methacrylate-acrylonitrile-butadiene-styrene resin (g-MABS or so-called "transparent ABS resin") can be used as a scratch resistant material. Although the transparent ABS resin has good colorability, gloss, and impact resistance, it does not have sufficient scratch properties such as R-hardness and flexural modulus. Accordingly, the material can warp or bend during molding processes.

Further, ABS/PMMA alloy has poor colorability and does not exhibit sufficient scratch resistance, although it has good impact resistance.

SUMMARY OF THE INVENTION

The present invention can provide a resin composition having good scratch resistance. The present invention can further provide a resin composition having a good balance of physical properties, such as colorability, weatherability, gloss, and impact resistance. Still further, the present invention can provide a resin composition having good balance of physical properties without requiring post-processing treatments, such as UV coating, acryl resin film coating, and the like.

The present inventors have developed a resin composition having good scratch resistance as well as a good balance of physical properties by blending a graft resin having a double shell structure and a resin including (meth) acrylic acid alkyl esters.

One aspect of the invention provides a scratch resistant resin composition comprising (A) about 5 to about 50 parts by weight of a core-shell graft resin and (B) about 95 to about 50 parts by weight of a resin including about about 40 to about 100% by weight of a (meth) acrylic acid alkyl ester, wherein the core-shell graft resin (A) includes an outer shell comprising a (meth) acrylic acid alkyl ester.

The core-shell graft resin can have a double shell structure comprising an inner shell and an outer shell.

In exemplary embodiments of the invention, the outer shell may include polymethyl methacrylate (PMMA) resin.

In exemplary embodiments of the invention, the core of said core-shell graft resin (A) may include butadiene rubber or butadiene/styrene rubber.

In exemplary embodiments of the invention, the inner shell may include a styrene-acrylonitrile copolymer resin, and the outer shell may include a polymethyl methacrylate (PMMA) resin.

In other exemplary embodiments of the invention, the inner shell and the outer shell may include a methyl methacrylate-acrylonitrile-styrene copolymer.

The resin (B) may include polymethyl methacrylate resin, methyl methacrylate-acrylonitrile-styrene (MSAN) resin, methyl methacrylate-styrene resin (MS) or a mixture thereof.

In exemplary embodiments of the invention, the core-shell graft resin (A) can include methyl methacrylate-acrylonitrile-butadiene-styrene copolymer resin (g-MABS).

The core-shell graft resin (A) can include about 30 to about 70 parts by weight of rubber, about 15 to about 55 parts by weight of methyl methacrylate, about 1 to about 5 parts by weight of acrylonitrile and about 5 to about 35 parts by weight of styrene.

The inner shell can impart impact resistance, and the outer shell can impart scratch resistance.

The resin composition can have useful physical propoerties, such as a pencil hardness of about F to about 4H (in accordance with JIS K5401), an R-hardness of about 115 to about 123 (in accordance with ASTM D785) and an izod impact strength of about 7 to about 20 kgf·cm/cm (in accordance with ASTM D-256, ⅛ inch).

In exemplary embodiments of the invention, the core-shell graft resin (A) can be prepared by the steps comprising a first step of graft-polymerizing vinyl aromatic monomer and unsaturated nitrile monomer in the presence of rubber to form an inner shell; and a second step of adding (meth)acrylic acid alkyl ester monomer to graft-polymerize onto the inner shell. The method can further comprise a post-treatment step to form a powder.

In other exemplary embodiments of the invention, the core-shell graft resin (A) can be prepared by the steps comprising a first step of graft-polymerizing (meth) acrylic acid alkyl ester monomer, unsaturated nitrile monomer, and vinyl aromatic monomer in the presence of rubber to form an inner shell; and a second step of adding a monomer mixture comprising (meth)acrylic acid alkyl ester monomer, unsaturated nitrile monomer, and vinyl aromatic monomer to graft-polymerize onto the inner shell. The method can further comprise a post-treatment step to form a powder.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As noted above, one aspect of the invention relates to a resin composition having good scratch resistance. The resin composition can comprise (A) a core-shell graft resin with an outer shell comprising (meth) acrylic acid alkyl ester and (B) a resin including about 40 to about 100% by weight of a (meth)acrylic acid alkyl ester.

The core of the core-shell graft resin (A) may include a rubber selected from the group consisting of butadiene rubber, acryl rubber, ethylene/propylene rubber, butadiene/styrene rubber, acrylonitrile/butadiene rubber, isoprene rubber, ethylene-propylene-diene terpolymer (EPDM), polyorganosiloxane/polyalkyl(meth)acrylate rubber and mixtures thereof.

The shell of the core-shell graft resin (A) may include a polymer comprising at least one monomer selected from styrene, α-methylstyrene, halogen- or $C_1$-$C_8$ alkyl-substituted styrene, $C_1$-$C_8$ methacrylic acid alkyl esters, $C_1$-$C_8$ acrylic acid alkyl esters, acrylonitrile, methacrylonitrile, maleic anhydride, $C_1$-$C_4$ alkyl- or $C_6$-$C_{30}$ aryl N-substituted maleimide and mixtures thereof.

The shell can have a double shell structure comprising an inner shell and an outer shell.

The inner shell may impart impact resistance, and the outer shell may impart scratch resistance.

The inner shell may comprise a polymer comprising at least one monomer selected from styrene, α-methylstyrene, halogen- or $C_1$-$C_8$ alkyl-substituted styrene, $C_1$-$C_8$ methacrylic acid alkyl ester, $C_1$-$C_8$ acrylic acid alkyl ester, acrylonitrile, methacrylonitrile, maleic anhydride, $C_1$-$C_4$ alkyl- or $C_6$-$C_{30}$ aryl (such as phenyl) N-substituted maleimide and mixtures thereof.

The outer shell may comprise a polymer comprising at least one monomer selected from $C_1$-$C_8$ methacrylic acid alkyl esters and $C_1$-$C_8$ acrylic acid alkyl esters. In some embodiments, the outer shell may comprise a polymer comprising at least one monomer selected from styrene, α-methylstyrene, halogen- or $C_1$-$C_8$ alkyl-substituted styrene, acrylonitrile, methacrylonitrile, maleic anhydride, $C_1$-$C_4$ alkyl- or $C_6$-$C_{30}$ aryl (such as phenyl) N-substituted maleimide, $C_1$-$C_8$ methacrylic acid alkyl esters, $C_1$-$C_8$ acrylic acid alkyl esters and mixtures thereof.

In one embodiment of the invention, the inner shell may comprise a styrene-acrylonitrile copolymer resin, and the outer shell may comprise a polymethyl methacrylate (PMMA) resin.

In some embodiments, the inner shell and outer shell may comprise a methyl methacrylate-acrylonitrile-styrene copolymer.

The core-shell graft resin of the present invention may be prepared by the following methods.

In one embodiment, the inner shell and outer shell may have different monomer compositions. In these embodiments, the method may comprise a first step of graft-polymerizing vinyl aromatic monomer and unsaturated nitrile monomer in the presence of rubber to form an inner shell on the surface of rubber and a second step of forming an outer shell by graft-polymerizing (meth) acrylic acid alkyl ester monomer onto the inner shell so that the inner shell may be encompassed by the outer shell. In the first step, an oil-soluble redox initiator system may be employed. In the second step, a water soluble initiator may be employed.

The core-shell graft resin (A) prepared from the above method may be further subject to post-treatment steps, such as coagulation, wash, dehydration and the like, to form a powder.

In another embodiment, the inner shell and outer shell may have the same monomer composition. In these embodiments, the method may comprise a first step of graft-polymerizing a portion of a monomer mixture comprising (meth) acrylic acid alkyl ester monomer, unsaturated nitrile monomer, and vinyl aromatic monomer in the presence of rubber to form an inner shell and a second step of adding residual monomer mixture to graft-polymerize onto the inner shell. In the first step, an oil-soluble redox initiator system may be employed. In the second step, a water soluble initiator may be employed.

The core-shell graft resin (A) prepared from the above method may be further subject to post-treatment steps, such as coagulation, wash, dehydration and the like, to form a powder.

Examples of vinyl aromatic monomers suitable for use in the present invention can include without limitation styrene, α-methylstyrene, halogen- or $C_1$-$C_8$ alkyl-substituted styrene, and the like. These vinyl aromatic monomers may be used alone or in combination with each other. Examples of unsaturated nitrile monomers suitable for use in the present invention can include without limitation acrylonitrile, methacrylonitrile, maleic anhydride, $C_1$-$C_4$ alkyl- or $C_6$-$C_{30}$ aryl N-substituted maleimide, $C_1$-$C_8$ methacrylic acid alkyl esters, $C_1$-$C_8$ acrylic acid alkyl esters, and the like. These unsaturated nitrile monomers may be used alone or in combination with each other. Examples of $C_1$-$C_8$ methacrylic acid alkyl esters and $C_1$-$C_8$ acrylic acid alkyl esters useful in the invention can include without limitation acrylic acid methyl ester, acrylic acid ethyl ester, acrylic acid propyl ester, acrylic acid butyl ester, acrylic acid hexyl ester, acrylic acid 2-ethylhexyl ester, and corresponding methacrylic acid esters, including methacrylic acid methyl ester, and the like. These $C_1$-$C_8$ (meth) acrylic acid alkyl ester and $C_1$-$C_8$ acrylic acid alkyl ester monomers may be used alone or in combination with each other.

The core-shell graft resin prepared from the above methods may have improved colorability by making the refractive index of the graft MSAN of shell layer substantially the same as the refractive index of the rubber of the core layer. The core-shell graft resin prepared from the above methods may also have excellent scratch resistance by inducing methyl methacrylate monomer to be polymerized at the end of MSAN chain. Further, the core-shell graft resin may have high weatherability by enveloping the surface of rubber with methyl methacrylate in the outer layer.

In one embodiment of the invention, the core-shell graft resin (A) may be methyl methacrylate-acrylonitrile-butadiene-styrene copolymer resin (g-MABS).

In some embodiments, the core-shell graft resin (A) can comprise about 30 to about 70 parts by weight of rubber, about 15 to about 55 parts by weight of methyl methacrylate, about 1 to about 5 parts by weight of acrylonitrile and about 5 to about 35 parts by weight of styrene.

In one embodiment, an inner shell can be prepared by graft-polymerizing acrylonitrile and styrene monomer in the presence of about 30 to about 70% (based on solid content) of polybutadiene or butadiene-styrene rubber latex. Then, an outer shell can be formed by graft polymerizing methylmethacrylate monomer onto the inner shell so that the inner shell may be encompassed by the outer shell. The monomer mixture may be emulsion polymerized while adjusting the proportion of the monomer mixture to have the same refractive index as the rubber of the core. The core-shell graft resin from the above process may be coagulated, dehydrated and dried to obtain a g-MABS resin in a fine powdery form.

In another embodiment, a monomer mixture comprising methyl methacrylate, acrylonitrile and styrene monomer can be graft-polymerized in the presence of about 30 to about 70% (based on solid content) of polybutadiene or butadiene-styrene rubber latex by emulsion polymerization while adjusting the proportion of the monomer mixture to have the same refractive index as the rubber of the core. The core-shell graft resin from the above process may be coagulated, dehydrated and dried to obtain a g-MABS resin in a fine powdery form.

In exemplary embodiments of the invention, the rubber can have an average particle diameter of about 0.1 to about 0.3 μm. The resin composition obtained therefrom may have a good balance of physical properties such as impact resistance, colorability and gloss.

The butadiene rubber used in preparing the methyl methacrylate-acrylonitrile-butadiene-styrene copolymer resin (g-MABS) may be polybutadiene rubber or butadiene-styrene copolymer rubber. The content of styrene of the butadiene-styrene copolymer rubber may be about 0 to about 30%.

In some embodiments, when polybutadiene rubber is used as a rubber component, the g-MABS resin can comprise about 50.3 to about 22.2 parts by weight of methyl methacrylate, about 4.2 to about 1.5 parts by weight of acrylonitrile, about 30 to about 70 parts by weight of polybutadiene rubber and about 15.5 to about 6.3 parts by weight of styrene.

In some embodiments, when butadiene-styrene copolymer rubber is used as a rubber component, the g-MABS resin can comprise about 36.4 to about 15.8 parts by weight of methyl methacrylate, about 3.5 to about 1.5 parts by weight of acrylonitrile, about 30 to about 70 parts by weight of butadiene-styrene copolymer rubber and about 30.1 to about 12.7 parts by weight of styrene.

The graft ratio of the core-shell graft resin (A) can be about 30 to about 70%.

The resin composition of the present invention can be prepared by blending the core-shell graft resin (A) and the resin (B) including about 40 to about 100% by weight of a (meth) acrylic acid alkyl ester.

In some embodiments, the resin composition of the present invention can comprise about 5 to about 50 parts by weight, for example about 10 to about 35 parts by weight of the core-shell graft resin (A) and about 95 to about 50 parts by weight, for example about 90 to about 65 parts by weight of the resin (B).

When the amount of the core-shell graft resin (A) falls within the range of about 5 to about 50 parts by weight, the resulting resin composition may have good impact resistance, scratch resistance properties such as R-hardness, pencil hardness and the like as well as gloss and colorability.

The resin (B) may include methacrylate resin, methyl methacrylate-acrylonitrile-styrene (MSAN) resin, methyl methacrylate-styrene resin (MS) or mixtures thereof.

In some embodiments, the resin composition can comprise the core-shell graft resin (A) and polymethyl methacrylate resin. In exemplary embodiments, the resin composition can comprise about 10 to about 35 parts by weight of the core-shell graft resin (A) and about 90 to about 65 parts by weight of polymethyl methacrylate resin.

In exemplary embodiments of the invention, the resin composition can comprise about 10 to about 35 parts by weight of the core-shell graft resin (A), about 70 to about 20 parts by weight of polymethyl methacrylate resin and about 20 to about 45 parts by weight of MSAN resin.

In exemplary embodiments of the invention, the resin composition can comprise about 10 to about 35 parts by weight of the core-shell graft resin (A), about 80 to about 30 parts by weight of methyl methacrylate-styrene resin (MS) and about 10 to about 35 parts by weight of methyl methacrylate-acrylonitrile-styrene (MSAN) resin.

The resin composition of the present invention may further comprise anti-oxidants, stabilizers, lubricants, flame retardants, pigment, dye and the like, and mixtures thereof.

The resin composition according to the present invention can be prepared by extruding the core-shell graft resin (A), the resin (B) and additives together to form the thermoplastic resin in pellets.

The resin composition of the present invention may have a pencil hardness of more than about F (in accordance with JIS K5401), a R-hardness of more than about 115 (in accordance with ASTM D785) and an izod impact strength of more than about 7 kgf·cm/cm (in accordance with ASTM D-256, ⅛ inch). In exemplary embodiments of the invention, the resin composition may have a pencil hardness of about F to about 4H (in accordance with JIS K5401), an R-hardness of about 115 to about 123 (in accordance with ASTM D785) and an izod impact strength of about 7 to about 20 kgf·cm/cm (in accordance with ASTM D-256, ⅛ inch).

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

Preparation of Core-Shell Graft Resin

Example 1

55 parts by weight (as solid content) of polybutadiene rubber latex having an average particle diameter of 0.22 μm, 2.25 parts by weight of acrylonitrile, 9.52 parts by weight of styrene, 1.0 part by weight of potassium stearate, 0.15 parts by weight of t-dodecyl mercaptane, 0.2 parts by weight of cumene hydroperoxide, 0.4 parts by weight of dextrose and 140 parts by weight of ion-exchanged water are mixed by stirring. The temperature is raised to 60° C. while stirring. After 10 minutes from the time of reaching 60° C., a redox catalyst comprising 0.005 parts by weight of ferrous sulfate and 0.3 parts by weight of sodium pyrophosphate dissolved in water is added thereto to initiate graft polymerization. The temperature of the reactor is maintained at 70° C. for 60 minutes. The polymerization is carried out at 70° C. for an additional 30 minutes to give an inner shell layer. After completion of the polymerization of the inner shell layer, 0.6 parts by weight of potassium persulfate is added. Then, a mixture comprising 33.23 parts by weight of methyl methacrylate and 0.3 parts by weight of t-dodecyl mercaptane is added to the reactor continuously over a period of 3 hours to conduct the polymerization reaction. After completion of the addition, the polymerization reaction is continued for an additional 60 minutes. The reaction is cooled to 60° C. and 1 part by weight of M497 (manufactured by CHUKYO YUSHI CO., LTD) as an antioxidant is added to obtain a graft copolymer (g-MABS) latex having a double shell structure in which inner shell is surrounded by methyl methacrylate. The graft ratio of the graft copolymer (g-MABS) latex is 58%. The graft latex is coagulated with an aqueous solution comprising 1% magnesium sulfate and 1% sulfuric acid, washed, dehydrated and dried to yield a graft copolymer in the form of white powder containing less than 1% water.

Example 2

Example 2 is prepared in the same manner as in Example 1 except that butadiene-styrene rubbery polymer latex having an average particle diameter of 0.25 μm is used. The graft copolymer latex obtained therefrom has a graft ratio of 56%.

Example 3

Example 3 is prepared in the same manner as in Example 1 except that polybutadiene rubbery polymer latex having an average particle diameter of 0.18 μm is used. The graft copolymer latex obtained therefrom has a graft ratio of 60%.

Example 4

55 parts by weight (as solid content) of polybutadiene rubber latex having an average particle diameter of 0.22 μm, 0.67 parts by weight of acrylonitrile, 2.86 parts by weight of styrene, 9.97 parts by weight of methylmethacrylate, 1.0 part by weight of potassium stearate, 0.15 parts by weight of t-dodecyl mercaptane, 0.2 parts by weight of cumene hydroperoxide, 0.4 parts by weight of dextrose and 140 parts by weight of ion-exchanged water are mixed by stirring. The temperature is raised to 60° C. while stirring. After 10 minutes from the time of reaching 60° C., a redox catalyst comprising 0.005 parts by weight of ferrous sulfate and 0.3 parts by weight of sodium pyrophosphate dissolved in water is added thereto to initiate graft polymerization. The temperature of the reactor is maintained at 70° C. for 60 minutes. The polymerization is carried out at 70° C. for an additional 30 minutes to give an inner shell layer. After completion of the polymerization of the inner shell layer, 0.6 parts by weight of potassium persulfate is added. Then, a mixture comprising 1.58 parts by weight of acrylonitrile, 6.66 parts by weight of styrene, 23.26 parts by weight of methylmethacrylate and 0.3 parts by weight of t-dodecyl mercaptane is added to the reactor continuously over a period of 3 hours to conduct the polymerization reaction. After completion of the addition, the polymerization reaction is continued for an additional 60 minutes. The reaction is cooled to 60° C. and 1 part by weight of M497 (manufactured by CHUKYO YUSHI CO., LTD) as an antioxidant is added to obtain a graft copolymer latex. The graft ratio of the graft copolymer latex is 57%.

Example 5

55 parts by weight (as solid content) of butadiene-styrene (styrene content: 25%) rubber latex having an average particle diameter of 0.24 μm, 2.25 parts by weight of acrylonitrile, 9.52 parts by weight of styrene, 1.0 part by weight of potassium stearate, 0.15 parts by weight of t-dodecyl mercaptane, 0.2 parts by weight of cumene hydroperoxide, 0.4 parts by weight of dextrose and 140 parts by weight of ion-exchanged water are mixed by stirring. The temperature is raised to 60° C. while stirring. After 10 minutes from the time of reaching 60° C., a redox catalyst comprising 0.005 parts by weight of ferrous sulfate and 0.3 parts by weight of sodium pyrophosphate dissolved in water is added thereto to initiate graft polymerization. The temperature of the reactor is maintained at 70° C. for 60 minutes. The polymerization is carried out at 70° C. for an additional 30 minutes to give an inner shell layer. After completion of the polymerization of the inner shell layer, 0.6 parts by weight of potassium persulfate is added. Then, a mixture comprising 33.23 parts by weight of methyl methacrylate and 0.3 parts by weight of t-dodecyl mercaptane is added to the reactor continuously over a period of 3 hours to conduct the polymerization reaction. After completion of the addition, the polymerization reaction is continued for an additional 60 minutes. The reaction is cooled to 60° C. and 1 part by weight of M497 (manufactured by CHUKYO YUSHI as an antioxidant is added to obtain a graft copolymer (g-MABS) latex having a double shell structure in which inner shell is surrounded by methyl methacrylate. The graft ratio of the graft copolymer (g-MABS) latex is 61%.

Preparation of Thermoplastic Resin Containing g-MABS:

The PMMA resin used in the following Examples is TP-100 or TP-160 (product name) manufactured by Cheil Industries Inc. The MS resin used in the following Examples is DENKA TX-600XL. The MSAN resin used in the following Examples is CT-5520 manufactured by Cheil Industries Inc.

The MS resin used in the following Comparative Examples is DENKA TX-320XL or MS-300 manufactured by NIPPON STEEL CO., LTD.

Example 6

To 18 parts by weight of the graft copolymer obtained from Example 1, 50 parts by weight of PMMA resin, 32 parts by weight of MSAN resin, 0.3 parts by weight of Irganox 1076 (Ciba) as an antioxidant, 0.4 parts by weight of ethylenebis stearamide as a lubricant, 0.3 parts by weight of magnesium stearate as a stabilizer and 0.3 parts by weight of carbon black are added and extruded to prepare pellets. The pellets are molded into test specimens using an injection molding machine to a size of 2.2 mm×10 mm×6 mm for measuring colorability and weatherability.

Example 7

Example 7 is prepared in the same manner as in Example 6 except that 22 parts by weight of the graft copolymer obtained from Example 1 and 78 parts by weight of PMMA resin are used.

Example 8

Example 8 is prepared in the same manner as in Example 6 except that 18 parts by weight of the graft copolymer obtained from Example 1, 60 parts by weight of MS resin and 22 parts by weight of MSAN resin are used.

Example 9

Example 9 is prepared in the same manner as in Example 6 except that 14 parts by weight of the graft copolymer obtained from Example 1, 50 parts by weight of PMMA resin and 36 parts by weight of MSAN resin are used.

Example 10

Example 10 is prepared in the same manner as in Example 6 except that the graft copolymer obtained from Example 2 is used instead of the graft copolymer obtained from Example 1.

Example 11

Example 11 is prepared in the same manner as in Example 6 except that the graft copolymer obtained from Example 3 is used instead of the graft copolymer obtained from Example 1.

Example 12

Example 12 is prepared in the same manner as in Example 6 except that the graft copolymer obtained from Example 4 is used instead of the graft copolymer obtained from Example 1.

Example 13

Example 13 is prepared in the same manner as in Example 8 except 18 parts by weight of the graft copolymer obtained from Example 4, 60 parts by weight of MS resin and 22 parts by weight of MSAN resin are used.

Example 14

Example 14 is prepared in the same manner as in Example 6 except that the graft copolymer obtained from Example 5 is used instead of the graft copolymer obtained from Example 1.

Comparative Example 1

Comparative Example 1 is prepared in the same manner as in Example 8 except that 100 parts by weight of high heat resistant polymethylmethacrylate resin (PMMA: TP-100 manufactured by Cheil Industries Inc.) is used.

Comparative Example 2

Comparative Example 2 is prepared in the same manner as in Example 8 except that 22 parts by weight of the graft copolymer obtained from Example 6 and 78 parts by weight of methylmethacrylate-styrene resin (MS:MS-300 manufactured by NIPPON STEEL CO., LTD) which contains 30% of methyl methacrylate is used.

Comparative Example 3

Comparative Example 3 is prepared in the same manner as in Example 8 except that 15 parts by weight of the graft copolymer obtained from Example 6 and 85 parts by weight of methylmethacrylate-styrene resin (MS:TX-320XL manufactured by DENKA) which contains 20% of methyl methacrylate is used.

Comparative Example 4

Comparative Example 4 is prepared in the same manner as in Example 8 except that 100 parts by weight of ABS resin (Cheil SD-0150 manufactured by Cheil Industries Inc.) is used.

Comparative Example 5

Comparative Example 5 is prepared in the same manner as in Example 8 except that 60 parts by weight of ABS resin (Cheil SD-0150 manufactured by Cheil Industries Inc.) and 40 parts by weight of PMMA resin are used.

Comparative Example 6

Comparative Example 6 is prepared in the same manner as in Example 8 except that ABS resin (Cheil SD-0150 manufactured by Cheil Industries Inc.) coated with urethane and UV consecutively is used.

The resultant graft copolymer lattices obtained from Examples 1 to 5 are coagulated by isopropyl alcohol, dehydrated and dried to obtain white powder. The powder is dissolved with acetone followed by centrifugal separation. Insoluble portions are washed and dried, and the weight is measured. The graft ratio is obtained by the following equation:

$$\text{Graft ratio} = \frac{\text{Weight of the insoluble portion} - \text{Weight of rubber}}{\text{Weight of rubber (solid content)}} \times 100$$

The physical properties of test specimens obtained in the above Examples and Comparative Examples are measured as follows and the results are shown in Table 1 and 2:

(1) Light Transmissivity of g-MABS: The light transmissivity of the g-MABS prepared from Examples 1-5 is evaluated as total light transmittance using a color computer manufactured by SUGA INSTRUMENT Co., Ltd. of Japan. The total light transmittance (%) is calculated from the following formula: total light transmittance (%)=(light transmitted at all forward angles/incident light)×100.

(2) Pencil Hardness: The pencil hardness was measured by applying 500 g load 5 times to a surface of test sample having a size of 3 mm (thickness)×10 mm (length)×6 mm (width) according to JIS (Japanese Industry Standard) K5401 at 23° C. The surface of the sample is visually checked for scratches. If scratches are observed in two or more, the test is repeated with a pencil of one grade lower hardness. The results were classified into 4B to 7H.

(3) R-Hardness: The Rockwell Hardness is measured in accordance with ASTM D785.

(4) Gloss: The gloss is measured in accordance with ASTM D523(%).

(5) Flexural modulus and Tensile strength: The flexural modulus is measured in accordance with ASTM D790 (kgf/cm$^2$), and the tensile strength is measured in accordance with ASTM D638 (kgf/cm$^2$).

(6) Notch Izod Impact Strength: The notch Izod impact strength is measured in accordance with ASTM D256 (⅛ inch, kgf·cm/cm).

(7) Colorability: The values of ΔL and Δb are measured by means of a spectrophotometer. The standard is the ABS resin obtained from Comparative Example 4. If ΔL is negative, this means that the sample is lighter than the standard. Δb defines the difference as a blue/yellow value. If Δb is negative, the sample is more blue, which means good colorability.

(8) Weatherability: The weatherability is measured in accordance with ASTM D4329 and evaluated by Delta E after UV radiation for 100 hours.

(9) Flowability: The melt flow index is measured in accordance with ISO 1103 under conditions of 220° C. and an applied mass of 10 Kg (g/10 min).

TABLE 1

|  | Example | | | | |
|---|---|---|---|---|---|
|  | 1 | 2 | 3 | 4 | 5 |
| Light Transmissivity | 72 | 68 | 73 | 83 | 81 |

TABLE 2

| | | Resin property | | | | | | | colorability | |
|---|---|---|---|---|---|---|---|---|---|---|---|
| | | IZOD impact strength | gloss | R-Hardness | Pencil Hardness | Tensile strength | flexural modulus | Flow-ability | Eye test | delta L | Weather-ability |
| Examples | 6 | 11 | 97 | 117 | H | 550 | 25,300 | 11 | ☺ | −2.5 | 0.7 |
| | 7 | 9 | 96 | 118 | 2H | 560 | 26,000 | 7 | ☺ | −2.8 | 0.5 |
| | 8 | 12 | 95 | 116 | H | 545 | 24,700 | 10 | ○ | −1.9 | 0.9 |
| | 9 | 10 | 98 | 118 | 2H | 560 | 25,500 | 9 | ☺ | −2.7 | 0.6 |
| | 10 | 12 | 96 | 117 | H | 545 | 24,900 | 12 | ☺ | −2.4 | 0.7 |
| | 11 | 9 | 98 | 118 | 2H | 561 | 25,900 | 10 | ☺ | −2.5 | 0.7 |
| | 12 | 11 | 98 | 117 | H | 555 | 25,500 | 11 | ☺ | −2.3 | 0.8 |
| | 13 | 13 | 95 | 116 | H | 544 | 24,200 | 12 | ○ | −2.0 | 1.0 |
| | 14 | 10 | 97 | 118 | 2H | 561 | 26,700 | 14 | ☺ | −2.9 | 1.1 |
| Comp. Examples | 1 | 1 | 138 | 122 | 4H | 760 | 31,000 | 5 | ☺ | −3.4 | 0.3 |
| | 2 | 11 | 91 | 112 | HB | 500 | 22,900 | 17 | Δ | −0.5 | 2.5 |
| | 3 | 12 | 92 | 111 | HB | 490 | 23,000 | 19 | Δ | −0.2 | 2.6 |
| | 4 | 22 | 90 | 110 | 2B | 510 | 22,500 | 21 | X | 0 | 3.8 |
| | 5 | 7 | 91 | 114 | F | 550 | 24,300 | 11 | Δ | −0.7 | 2.3 |
| | 6 | 9 | 99 | 103 | 2H | — | — | — | ☺ | — | 0.3 |

As shown in Table 2, Comparative Example 1 using only PMMA resin shows poor impact resistance and injection moldability, although it has good scratch properties such as pencil hardness and R-hardness, gloss, colorability, weatherability. Comparative Examples 2 and 3 in which MS resin contains methylmethacrylate in an amount of less than 40% show insufficient R-hardness and pencil hardness, and colorability. Further, the weatherability and the colorability deteriorated. Comparative Example 4 in which ABS resin is used alone shows poor pencil hardness, colorability and weatherability. Comparative Example 5 in which ABS/PMMA alloy is employed shows that impact resistance and colorability deteriorated. On the other hand, Examples 6 to 14 in which g-MABS and acryl resin alloy are employed show an excellent balance of physical properties of pencil hardness, R-hardness, colorability, weatherability, impact strength, flowability, tensile strength and flexural modulus.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A scratch resistant resin composition comprising:
   (A) about 5 to about 50 parts by weight of a core-shell graft resin having a double shell structure comprising an inner shell and an outer shell, wherein said inner shell comprises a styrene-acrylonitrile copolymer resin and said outer shell comprises a polymethyl methacrylate (PMMA) resin or wherein each of said inner shell and said outer shell comprises a methyl methacrylate-acrylonitrile-styrene copolymer; and
   (B) about 95 to about 50 parts by weight of a resin comprising about 40 to about 100% by weight of a (meth) acrylic acid alkyl ester,
   wherein said core-shell graft resin (A) comprises about 30 to about 70 parts by weight of rubber, about 15 to about 55 parts by weight of methyl methacrylate, about 1 to about 5 parts by weight of acrylonitrile and about 5 to about 35 parts by weight of styrene.

2. The scratch resistant resin composition of claim 1, wherein said core-shell graft resin (A) comprises:
   a core comprising a rubber selected from the group consisting of butadiene rubber, acryl rubber, ethylene/propylene rubber, butadiene/styrene rubber, acrylonitrile/butadiene rubber, isoprene rubber, ethylene-propylene-diene terpolymer (EPDM), polyorganosiloxane/polyalkyl(meth)acrylate rubber and mixtures thereof.

3. The scratch resistant resin composition of claim 1, wherein said outer shell comprises polymethyl methacrylate (PMMA) resin.

4. The scratch resistant resin composition of claim 2, wherein said core of said core-shell graft resin (A) comprises butadiene rubber or butadiene/styrene rubber.

5. The scratch resistant resin composition of claim 1, wherein said inner shell comprises said styrene-acrylonitrile copolymer resin and said outer shell comprises said polymethyl methacrylate (PMMA) resin.

6. The scratch resistant resin composition of claim 1, wherein each of said inner shell and said outer shell comprises said methyl methacrylate-acrylonitrile-styrene copolymer.

7. The scratch resistant resin composition of claim 1, wherein said resin (B) comprises polymethyl methacrylate resin, methyl methacrylate-acrylonitrile-styrene (MSAN) resin, methyl methacrylate-styrene resin (MS) or a mixture thereof.

8. The scratch resistant resin composition of claim 1, wherein said core-shell graft resin (A) comprises methyl methacrylate-acrylonitrile-butadiene-styrene copolymer resin (g-MABS).

9. The scratch resistant resin composition of claim 1, wherein said resin (B) comprises polymethyl methacrylate resin.

10. The scratch resistant resin composition of claim 1, wherein said inner shell imparts impact resistance, and said outer shell imparts scratch resistance.

11. The scratch resistant resin composition of claim 1, wherein said resin composition has a pencil hardness of about F to about 4H (as measured in accordance with JIS K5401), a R-hardness of about 115 to about 123 (as measured in accordance with ASTM D785) and an izod impact strength of about 7 to about 20 kgf·cm/cm (as measured in accordance with ASTM D-256, ⅛ inch).

12. A molded article comprising a scratch resistant resin composition, said scratch resistant resin composition comprising:
   (A) about 5 to about 50 parts by weight of a core-shell graft resin having a double shell structure comprising an inner shell and an outer shell, wherein said inner shell comprises a styrene-acrylonitrile copolymer resin and said outer shell comprises a polymethyl methacrylate (PMMA) resin or wherein each of said inner shell and said outer shell comprises a methyl methacrylate-acrylonitrile-styrene copolymer; and
   (B) about 95 to about 50 parts by weight of a resin comprising about 40 to about 100% by weight of a (meth) acrylic acid alkyl ester,
   wherein said core-shell graft resin (A) comprises about 30 to about 70 parts by weight of rubber, about 15 to about 55 parts by weight of methyl methacrylate, about 1 to about 5 parts by weight of acrylonitrile and about 5 to about 35 parts by weight of styrene.

13. The scratch resistant resin composition of claim 1, wherein:
   said core-shell graft resin (A) has a double shell structure comprising an inner shell and an outer shell, wherein said inner shell comprises a styrene-acrylonitrile copolymer resin and said outer shell comprises a polymethyl methacrylate (PMMA) resin, and wherein said core of said core-shell graft resin (A) comprises butadiene rubber; and
   wherein said resin (B) comprises polymethyl methacrylate resin.

* * * * *